Patented July 8, 1941

2,248,740

UNITED STATES PATENT OFFICE 2,248,740

MANUFACTURE OF HYDROGEN CHLORIDE AND ALKALI SULPHATE

Osborne Bezanson, Woburn, Mass., assignor, by mesne assignments, to Monsanto Chemical Company, a corporation of Delaware No Drawing. Application November 18, 1936, Serial No. 111,351

11 Claims. (Cl. 23—50)

My invention relates to the manufacture of hydrogen chloride and an alkali sulphate such as sodium sulphate, or potassium sulphate, of a high purity with increased efficiency and economy of operation from sulphuric acid and the corresponding alkali chloride.

The manufacture of sodium sulphate and hydrochloric acid by the reaction of sulphuric acid and sodium chloride is well known and widely utilized by roasting a mixture of sulphuric acid or acid sodium sulphate ("niter cake") and sodium chloride in various types of furnaces.

By "niter cake" it will be understood that I mean the product obtained in the manufacture of nitric acid of the composition $NaHSO_4$ while "salt cake" designates the solid products obtained in the manufacture of hydrogen chloride consisting mainly of $Na_2SO_4$.

In the utilization of the furnaces and processes heretofore known, however, many disadvantages have become apparent which add to the cost of operation and decrease the efficiency of the process. Among these is imperfect mixing of the materials causing a low conversion of the sodium chloride with a resulting high sodium chloride content of some portions of the salt cake produced and excessive amounts of free acid in other portions. To obtain a complete roasting of the salt cake and attendant high conversion of the sodium chloride with this type of mixture requires a very long retention in the roasting equipment. Also, in utilizing the furnaces known to the art wherein the mixing is accomplished by means of rotating parts, movable arms, hammers, traveling shafts or similar mechanical devices breakage, wear and corrosion are responsible for a high cost of upkeep and necessitate frequent plant shut-downs for repairs with corresponding increases in the cost of maintenance of the plant. It has also been found that the mixture obtained by these methods under certain conditions often fuses into hard, compact balls which are a source of serious trouble.

An object of my invention is to prepare a molecular mixture of sodium chloride and sodium acid sulphate of high reactivity which can be substantially completely converted to salt cake and hydrochloric acid in a very short time, thus permitting the same production of useful materials with much smaller equipment and requiring a correspondingly decreased capital investment.

Another object of my invention is to prepare a mixture of such a nature that the sulphuric acid or niter cake and sodium chloride are perfectly distributed so that the reaction will result in a substantially complete conversion, yielding a uniform product with less than .25% free acid and sodium chloride.

It is also an object of my invention to prepare a mixture of sodium chloride and sodium acid sulphate in which the molecules of each are so perfectly distributed that it can be processed so as to carry out the reaction $$NaHSO_4 \cdot NaCl \rightarrow HCl + Na_2SO_4$$

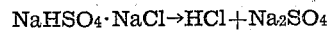

to substantial completion more easily and completely than has been possible heretofore.

Other objects will be apparent from the description.

I have discovered that if theoretical quantities of sulphuric acid and sodium chloride be mixed in a suitable type of mixer, the reactants first form a homogeneous solution after which the following reaction occurs:

$$2NaCl + H_2SO_4 \rightarrow NaHSO_4 \cdot NaCl + HCl$$

The resulting solid product as disclosed in the patent to Wilson 2,208,175 granted on application Serial No. 111,364 filed concurrently with this application has a melting point below 160° C. and is a true mixed crystal composed of sodium acid sulphate and sodium chloride possessing as a distinctive property a very high reaction rate upon heating as compared with the usual mechanical mixture of sodium chloride and niter cake. This high reacting rate and molecular association permit the completion of the reaction $$NaHSO_4 \cdot NaCl \rightarrow Na_2SO_4 + HCl$$

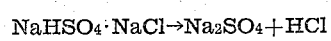

in twenty to thirty minutes at a temperature of 300 to 400° C. and this type of mixture is so uniform that the object of forming a salt cake containing less than .25% acid and sodium chloride is attained. In fact the heat of reaction, whereby the mixed crystal is formed, may under some conditions be enough to promote to a limited extent the sodium sulphate forming reaction.

To obtain the mixed crystal referred to above, acid, and sodium chloride, which preferably should be dry and ground finely, in the proportion of one molecule of sulphuric acid to two molecules of sodium chloride are mixed in any type of enclosed mixer where the reacting materials may be mixed or ground together while the reaction is taking place. I prefer to use strong sulphuric acid such as the monohydrate and at moderately elevated temperature although the latter is not always necessary. Similarly I prefer that the salt shall be substantially dry and finely ground to facilitate mixing and interaction with the acid but these conditions likewise are optional and dependent to some extent on the mixing facilities.

The acid is added to and mixed with the sodium chloride as quickly as possible. After the acid is added, the mixture passes through a fluid stage so that the whole charge is in a liquid state, from which the mixed crystal granulates in the form of a fine, powder-like mass which, if the proper stoichiometric quantities of acid and sodium chloride have been used, may be kept for long periods of time without caking and may be screened or handled by the usual mechanical means without deterioration if maintained in a dry condition.

The mixed crystal may be processed in the known stationary or agitated type salt cake furnaces to form salt cake and hydrogen chloride. The furnaces may be of the directly heated type wherein combustion gases contact the mixed crystal or in the indirectly heated type as for example the well known Mannheim furnace. No moving parts such as arms, beaters, rakes, hammers, shafts or other mechanical mixing devices are necessary in the furnace for mixing purposes, since the sodium chloride and acid sodium sulphate are fed into it in a more perfect mixture than it is possible to obtain by mechanical means.

The following is a specific example illustrating my invention. Commercial salt is dried so as to remove all moisture and ground so that it will all pass through a 100 mesh screen. A charge of 700 pounds is carefully weighed out and transferred to any of several types of commercial mixers, preferably one permitting maximum intermixing of solid and liquid, with or without auxiliary crushing or grinding action. Preferably it is maintained at an elevated temperature to avoid corrosion which might otherwise result if moisture entered the system. To the foregoing charge 586 pounds of 100% sulphuric acid heated to a temperature of 93–121° C. are added quickly and under conditions calculated to effect intimate and prompt mixing. The mass in the mixer will form a perfectly homogeneous mixture, evolving copious amounts of hydrogen chloride gas which may be absorbed in the usual manner. After one or two minutes of complete fluidity, a mixed crystal of the composition $NaHSO_4 \cdot NaCl$ will separate and dry out practically instantaneously to a fine powder. This reaction taking place in the mixer is exothermic. Part of the heat generated which has not been removed in the discharged gas is sufficient to carry out a part of the endothermic reaction $$NaCl \cdot NaHSO_4 \rightarrow Na_2SO_4 + HCl$$

so that the resulting mixer product may show that as much as 56% or even more of the total chlorine content of the initial salt charge has been evolved as hydrogen chloride. By eliminating air leakage the gas will be of very high hydrogen chloride content.

The product so obtained is converted to salt cake of high purity and hydrogen chloride by heating to 300–400° C. for twenty to thirty minutes. The heating may be effected in an internally or externally heated furnace.

I have also found that in view of the fact that the temperature at which reaction takes place is low by comparison with that of present day mixtures of ground niter cake and salt and further in view of the absence of moisture I can pass the material through an externally fired cast iron or steel kiln thereby producing a high strength hydrogen chloride gas at low fuel cost. For this purpose it is convenient to mix the material to be roasted with a quantity of roasted sulphate to avoid caking in the furnaces although this is not essential.

While monohydrate acid gives good results it is to be understood that oleum may be used.

The principles of the invention described hereinabove may be applied to the manufatcure of potassium sulphate to advantage.

What I claim is:

1. The process of producing mixed crystals composed of alkali chloride and alkali acid sulphate which comprises mixing substantially water free sulphuric acid with alkali chloride in a molar ratio of 1:2 and permitting the resulting mixture to react to evolve hydrogen chloride gas and to form a substantially homogeneous solution which crystallizes to a substantially dry mass.

2. The process of producing mixed crystals composed of sodium chloride and sodium acid sulphate which comprises mixing substantially water free sulphuric acid with sodium chloride in a molar ratio of 1:2 and permitting the resulting mixture to react to evolve hydrogen chloride gas and to form a substantially homogeneous solution which crystallizes to a substantially dry mass.

3. The process of simultaneously preparing hydrogen chloride gas and mixed crystals composed of sodium chloride and sodium acid sulphate which comprises mixing substantially water free sulphuric acid with sodium chloride in a molar ratio of 1:2 and heating the mixture and permitting it to react until hydrogen chloride gas ceases to evolve and a substantially homogeneous solution is formed which crystallizes to a substantially dry mass.

4. The process of simultaneously preparing hydrogen chloride gas and mixed crystals composed of sodium chloride and sodium acid sulphate which comprises grinding sodium chloride to about 100 mesh, adding thereto substantially water free sulphuric acid in the ratio of one mol of acid to two mols of salt and permitting the resulting mixture to react until hydrogen chloride gas ceases to evolve and a substantially homogeneous solution is formed which crystallizes to a substantially dry mass.

5. The process of simultaneously preparing hydrogen chloride gas and mixed crystals composed of sodium chloride and sodium acid sulphate which comprises grinding sodium chloride to about 100 mesh, drying the resulting salt, and adding thereto substantially water free sulphuric acid in the ratio of one mol of acid to two mols of salt and permitting the resulting mixture to react until hydrogen chloride gas ceases to evolve and a substantially homogeneous solution is formed which crystallizes to a substantially dry mass.

6. The process of simultaneously preparing mixed crystals composed of equal molecular quantities of sodium chloride and sodium acid sulphate which comprises mixing sulphuric acid monohydrate (100% $H_2SO_4$) with sodium chloride in a molar ratio of 1:2 and permitting the resulting mixture to react until about one mol of hydrogen chloride is evolved and a substantially homogeneous solution is formed which crystallizes to a substantially dry mass.

7. The method of preparing neutral alkali sulphate and hydrogen chloride gas which comprises mixing substantially water free sulphuric acid with alkali chloride in a molar ratio of 1:2 and permitting the resulting mixture to react to evolve hydrogen chloride gas and to form a substantialy homogeneous solution which crystallizes to a substantially dry mass, and finally roasting said mass to form neutral sodium sulphate and additional hydrogen chloride gas.

8. The method of preparing neutral sodium sulphate and hydrogen chloride gas which comprises mixing substantially water free sulphuric acid with sodium chloride in a molar ratio of 1:2 and permitting the resulting mixture to react to evolve hydrogen chloride gas and to form a substantially homogeneous solution which crystallizes to a substantially dry mass, and finally roasting said mass to form neutral sodium sulphate and additional hydrogen chloride gas.

9. The method of preparing neutral sodium sulphate and hydrogen chloride gas which comprises mixing substantially water free sulphuric acid with sodium chloride in a molar ratio of 1:2 and permitting the resulting mixture to react to evolve hydrogen chloride gas and to form a substantially homogeneous solution which crystallizes to a substantially dry mass, and finally roasting said mass at 300° to 400° C. for from 20 to 30 minutes to form neutral sodium sulphate and evolve additional hydrogen chloride.

10. The process of simultaneously preparing hydrogen chloride gas and mixed crystals composed of sodium chloride and sodium acid sulphate which comprises heating substantially anhydrous sulphuric acid to between 93° and 121° C., quickly adding said acid to sodium chloride in the ratio of one mol of acid to two mols of salt, and stirring the mixture and permitting it to react until hydrogen chloride gas ceases to evolve and a substantially homogeneous solution is obtained which crystallizes to a substantially dry mass.

11. As a composition of matter, a mixed crystal composed of sodium chloride and sodium acid sulphate in substantially equal molecular ratio, said material being obtained by allowing a mixture of sodium chloride and substantially anhydrous sulphuric acid in a molar ratio of two to one to react to evolve hydrogen chloride and form a homogeneous solution which crystallizes into the form of a mixed crystal, said material being further characterized in that it has a melting point below 160° C. and may be quickly and substantially completely converted to hydrogen chloride and sodium sulphate and being further characterized in that it is substantially free of sodium chloride and sodium acid sulphate as such.

OSBORNE BEZANSON.